Aug. 28, 1934.   B. F. HALVORSEN   1,971,815
TREATMENT OF SULPHUROUS IRON ORES
Filed Jan. 29, 1932
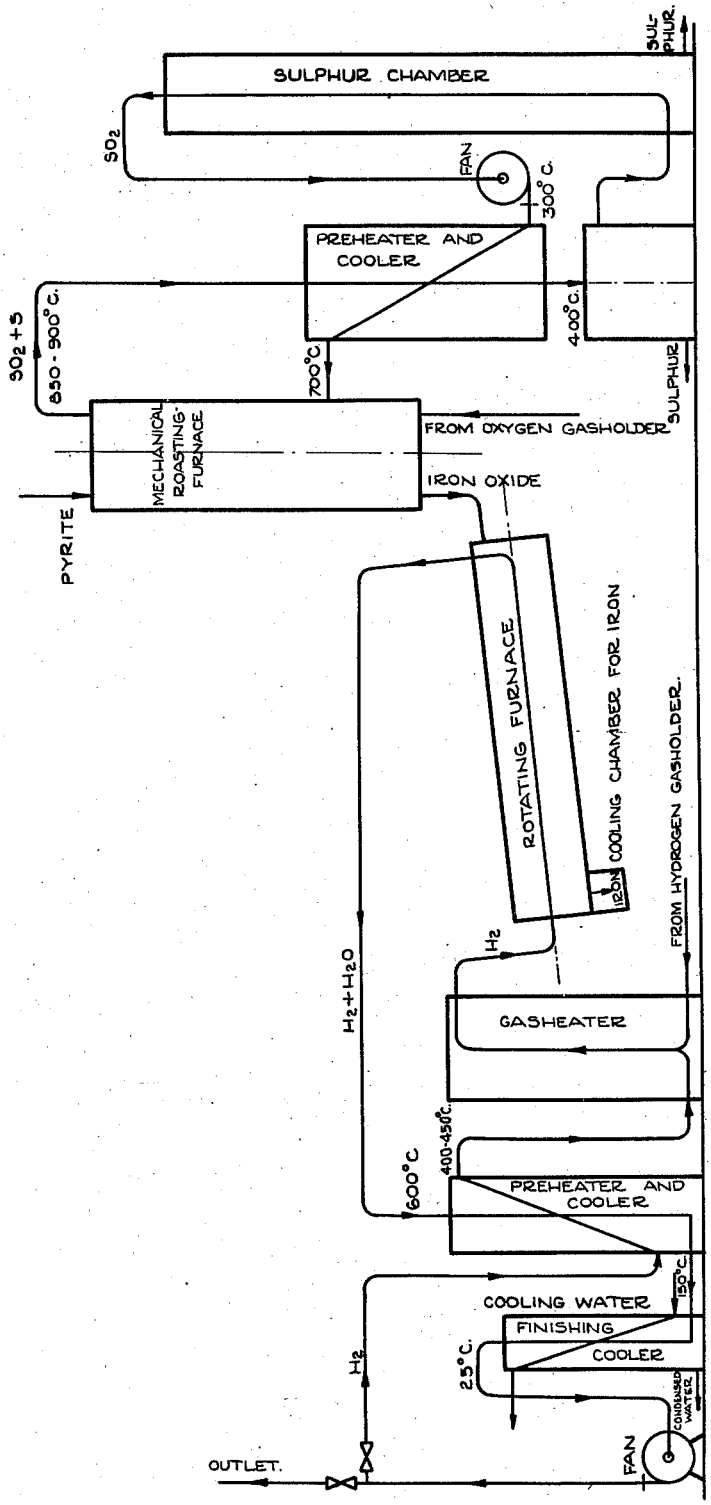
INVENTOR
B. F. HALVORSEN
By
Attorneys Patented Aug. 28, 1934

1,971,815

UNITED STATES PATENT OFFICE 1,971,815

TREATMENT OF SULPHUROUS IRON ORES

Birger Fjeld Halvorsen, Aker, near Oslo, Norway

Application January 29, 1932, Serial No. 589,761
In Norway January 30, 1931

5 Claims. (Cl. 75—75)

My invention relates to the treatment of sulphurous iron ores (pyrites) for the purpose of obtaining sulphur and iron and other valuable products. One object of my invention is to carry out the roasting process in such manner, that I obtain sulphur directly and as a second product iron oxide. Another object of my invention is to utilize oxygen and hydrogen obtained by electrolysis of water for the purposes of my invention, making use of the oxygen for the roasting process and of the corresponding quantity hydrogen (obtained by electrolysis) for the reduction of the iron oxide to iron.

Other objects of my invention will be mentioned in the following specification describing a preferred manner of carrying out my invention. Referring to the drawing, the figure represents diagrammatically the apparatus employed for carrying out my process.

The first step in my process is the roasting of the ore. According to my invention pure oxygen is conducted to the sulphurous iron ores in a roasting furnace in such a manner that the result of the reactions taking place between the ores and the gas is the forming of iron oxides and elemental sulphur which are taken out of the furnace.

Part of the sulphur obviously will be oxidized primarily, but the sulphur dioxide thus formed, may after the condensation or the absorption of the sulphur, together with fresh oxygen be returned to the roasting furnace (the whole working in circulation) and therefore will do no harm. By employing oxygen not diluted with inert gases as described it is possible on one hand to carry out the process on an industrial scale without supply of heat from outside, and on the other hand sulphur is obtained directly in free state.

In carrying out the process in this way the further advantage is obtained that it can be combined with an economic production of hydrogen and oxygen by electrolysis, because the amounts of hydrogen and oxygen for the two stages of the process exactly correspond with proportion of these elements in water.

It is a difficult matter to positively state the chemical reactions really taking place in the roasting furnace by the process according to the invention. When, however, pyrite is to be treated the reactions probably are as follows:

1. The pyrite is decomposed while sulphur escapes:

$$2FeS_2 \rightarrow 2FeS + S_2.$$

2. The sulphides will be oxydized by the oxygen conducted to the furnace:

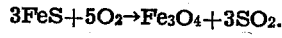
$$3FeS + 5O_2 \rightarrow Fe_3O_4 + 3SO_2.$$

3. A part of the sulphur dioxide gas formed will react with the sulphides and form elemental sulphur, f. inst. as follows:

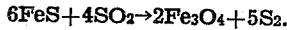
$$6FeS + 4SO_2 \rightarrow 2Fe_3O_4 + 5S_2.$$

The remaining part of the sulphur dioxide will be returned to the roasting furnace in circulation.

The result of these reactions under continuous working may be expressed by the equation:

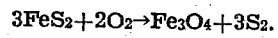
$$3FeS_2 + 2O_2 \rightarrow Fe_3O_4 + 3S_2.$$

The gases being in continuous circulation, the sulphur is eliminated therefrom by condensation or absorption, whereupon the gases together with the necessary quantity new oxygen is conducted to the roasting furnace.

Second step

The roasted pyrite is thereupon in glow-hot condition transferred to the reduction furnace, in which the iron oxide is reduced by means of hydrogen to iron and water. The water is condensed and the hydrogen, continuously renewed by adding new hydrogen in the correct proportion, is returned to the furnace. The reaction will be:

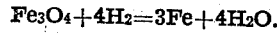
$$Fe_3O_4 + 4H_2 = 3Fe + 4H_2O.$$

Heat is saved by employing the offgoing hot gases for preheating the ingoing gases. In the reduction process some heat has to be conducted to the hydrogen. This can be effected by direct heating for instance by means of an electric arc or by adding a little oxygen to the hydrogen.

As will be seen from the above the quantities of oxygen and hydrogen necessary for the chemical reactions in the process exactly correspond with the proportions of oxygen and hydrogen in water.

I do not claim the production of sulphur by a distilling process the pyrite being treated in a closed distillation retort. Nor do I claim the combination of a distilling process by which, after the forming of a certain quantity of sulphur, the remainders in the retort are exposed to a roasting process in air or in a mixture of oxygen with nitrogen or carbonic acid, but what I claim is:

1. In a process for the production of sulphur and iron from sulphurous iron ores without applying carbonaceous materials as a reducing agent the step which consists in treating the raw material in a roasting furnace with oxygen and sulphur dioxide, which latter is formed during the process, conveying to the furnace such quantities of the sulphide ores and oxygen that the result of the reactions is the forming of iron oxides and elemental sulphur which are taken out of the furnace.

2. In a process for the production of sulphur and iron from sulphurous iron ores without applying carbonaceous materials as a reducing agent, treating the raw material in a roasting furnace with oxygen and sulphur dioxide, which latter is formed in the process, conveying to the furnace such quantities of the sulphide ores and oxygen that the result of the reactions is the forming of iron oxides and elemental sulphur, causing the gases to circulate continuously through the material being roasted, iron oxides and elemental sulphur being taken out of the furnace.

3. In a process for the production of sulphur and iron from sulphurous iron ores without applying carbonaceous materials as reducing agents the step which consists in treating the raw material in a roasting furnace with oxygen and sulphur dioxide, which former is produced by the electrolysis of water and which latter is formed during the process, conveying to the furnace such quantities of the sulphide ores and oxygen that the result of the reactions is the forming of iron oxides and elemental sulphur, and subsequently reducing the iron oxides with hydrogen produced by the electrolysis of water in the same plant which delivers the oxygen used for the oxidation of the sulphurous iron ores.

4. In a process for the production of sulphur and iron from sulphurous iron ores without applying carbonaceous materials as reducing agents, treating the raw material in a roasting furnace with oxygen and sulphur dioxide, which former is produced by the electrolysis of water and which latter is formed in the process, conveying to the furnace such quantities of the sulphide ores and oxygen that the result of the reactions is the forming of iron oxides and elemental sulphur, causing the gases to circulate continuously through the material being roasted, and subsequently reducing iron oxides with hydrogen produced by the electrolysis of water in the same plant which delivers the oxygen used for the oxidation of the sulphurous iron ores.

5. In a process for the production of sulphur and iron from sulphurous iron ores without applying carbonaceous materials as reducing agents, treating the raw material in a roasting furnace with oxygen and sulphur dioxide, which former is produced by the electrolysis of water and which latter is produced by the reaction of the oxygen with a part of the raw material, conveying to the furnace amounts of the sulphide ores and oxygen in such ratio that the result of the reactions is the forming of iron oxides and free sulphur, causing the reaction gases to be recirculated through the furnace along with the oxygen supplied thereto, and subsequently reducing the iron oxides to free iron with hydrogen produced by the electrolysis of water in the same generator which delivers the oxygen used for the oxidation of the sulphurous iron ores, the ratio of the quantity of hydrogen used for reduction of the iron oxides to the quantity of oxygen used for the oxidation of the raw material being that in which hydrogen and oxygen occur in water.

BIRGER FJELD HALVORSEN.